(12) United States Patent
Wurm

(10) Patent No.: US 7,997,640 B1
(45) Date of Patent: Aug. 16, 2011

(54) AERODYNAMIC FLEX FENDER

(75) Inventor: Charles Richard Wurm, San Jose, CA (US)

(73) Assignee: Charles Richard Wurm, San Jose, CA (US)

( * ) Notice: Subject to any disclaimer, the term of this patent is extended or adjusted under 35 U.S.C. 154(b) by 0 days.

(21) Appl. No.: 12/804,721

(22) Filed: Jul. 28, 2010

(51) Int. Cl.
*B60J 7/00* (2006.01)
(52) U.S. Cl. ................................. 296/180.1; 280/849
(58) Field of Classification Search .............. 296/198, 296/180.1; 280/849
See application file for complete search history.

(56) References Cited

U.S. PATENT DOCUMENTS

| | | | | |
|---|---|---|---|---|
| 1,989,368 | A | * | 1/1935 | Knapp ................ 280/849 |
| 2,010,350 | A | * | 8/1935 | Davis ................. 280/849 |
| 2,111,983 | A | | 3/1938 | Massey |
| 3,784,226 | A | * | 1/1974 | Wilfert et al. ............ 280/157 |
| 4,611,847 | A | * | 9/1986 | Sullivan ............ 296/180.2 |
| 5,184,832 | A | | 2/1993 | Miwa |
| 5,544,931 | A | | 8/1996 | Nelson |
| 6,007,102 | A | * | 12/1999 | Helmus ............. 280/849 |
| 6,230,836 | B1 | | 5/2001 | Cowan et al. |
| 6,820,475 | B2 | | 11/2004 | Wallach |
| 7,374,229 | B1 | * | 5/2008 | Noll et al. ............ 296/180.2 |
| 2010/0217490 | A1 | * | 8/2010 | Canfield ............ 701/49 |

* cited by examiner

*Primary Examiner* — Joseph Pape

(57) ABSTRACT

The presented application is a system to improve the aerodynamic shape of a moving vehicle by covering and closing the wheel well openings. The covers described open and close as necessary to accommodate steering wheel movements. The improved aerodynamics reduces turbulence and improves vehicle-operating efficiency.

2 Claims, 2 Drawing Sheets

AERODYNAMIC FLEX FENDER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Technical Field

This application relates to vehicles with open face wheel wells that allow you to see the side view of a wheel or wheels.

2. Prior Art

Aerodynamic improvements to vehicle bodies are well known in prior art. Many different designs have been proposed, built and tested. Some discuss enclosing the vehicle wheels from outside moving air to improve vehicle stability and reduce turbulence. In some cases air resistance is reduced by allowing the air to pass through openings in the body instead of being force around it. Reducing turbulence and air resistance reduces a vehicles aerodynamic drag coefficient. Allowing it to move through the air using less energy and wasting less energy.

Previous art was found describing both aerodynamic shapes and moveable body sections. Many related to improving aerodynamics or stability at higher speeds. None could be found related to covering and streamlining the wheels that steer the vehicle.

Improved Aerodynamic Shapes:

One example of such a vehicle design is shown in U.S. Pat. No. 2,111,983 Massey (1938) Wheel Arrangement for Streamline Vehicles. Adjusting the side wheels of this vehicle higher or lower changes the center of gravity. Offering greater vehicle stability by having the body lean into corners while turning. Like a motorcycle. This body style fully encloses all the vehicle wheels.

No vehicle design details are shown. The description states suspension members and springs can easily be added. Although it is an interesting design too many details are excluded. It shows electric motors on both sides of the rear wheel. It states they could also be on the front wheel. For this unique suspension a more complete vehicle design is required before it can have any practical application.

Another aerodynamic design idea is shown in U.S. Pat. No. 5,184,832 Miwa (1993) Aerodynamic Motorcar. It reduces air resistance by allowing the air in encounters to enter passageways on the vehicle and go through them. Instead of having the vehicle encounter the resistance of pushing through the air. It was also said to improve stability.

It is an interesting idea to reduce a vehicles forward motion air resistance. No effort is made to reduce the air turbulence from the body openings at the wheels. Covering these areas could of further reduced turbulence and the aerodynamic drag coefficient.

Another aerodynamic design change is shown in U.S. Pat. No. 6,230,836 Cowan (2001) Aerodynamic Automobile. This design has the automobile shape provide a downward pressure from the top and a suction surface from below to improve stability. It also shows the rear wheels being mostly covered to reduce turbulence. The overall design is very aerodynamic.

The vehicle rounded front windshield protrudes well over the front axle. This places the driver far away from the front of the car. Making the car very difficult to negotiate in traffic or while parking. This shape is best suited for continuous straight driving without vehicle traffic. The solid rear panel also produces a large blind spot. This body style is a poor shape when driving with other vehicles or in tight locations. For most typical driving circumstances this shape is not practical.

A design improving wheel aerodynamics is shown in U.S. Pat. No. 6,820,475 Wallach (2004) Wheel Cover. This design improves wheel aerodynamics and helps to cool the brakes. The round dome shape of the wheel cover improves the aerodynamics. It eliminates the turbulent effect of the spinning lug nuts that hold the wheel to the hub. At the center of this dome is an exhaust valve allowing warmed air from brake operation to leave. This design is mentioned to be for large vehicles like trucks.

The dome shape is more aerodynamic. There would still be significant turbulence created from the air movement around the entire wheel. Large gaps still exist in front of, behind and above the wheel. No mention is made of eliminating this turbulence. No mention is made of reducing the large body opening the wheel sets within. Only the hubcap is discussed. The turbulence caused from a spinning open wheel is significant. The aerodynamic cover will make a small reduction in this turbulence.

Moveable Body Sections:

An aerodynamic design using movable body panels is shown in U.S. Pat. No. 5,544,931 Nelson (1996) Aerodynamic Stabilizer for use with a Motor Vehicle. This design has movable portions of the body at the rear roof and front hood near the windshield. These panels open and close to stabilize the vehicles at high speeds. Creating a downward force that pushes the vehicle onto the road. This design helps prevent the vehicle from becoming airborne during spinouts at high speed.

These movable body panels do not improve aerodynamic shape to reduce vehicle drag coefficient.

Other aerodynamic vehicle designs were found using movable panels. These were mostly for large truck cabs and bodies. These designs had no, or limited, application in designs to improve the aerodynamics and reduce the drag coefficient of passenger vehicles.

BRIEF SUMMARY OF THE INVENTION

My proposed aerodynamic design has body portions that open as the steering wheels make small radius low speed turns. Most driving is done when not making small radius low speed turns and the covers will usually remain closed. When closed they reduce aerodynamic turbulence.

BRIEF DESCRIPTION OF SEVERAL VIEW OF DRAWINGS

Figure 1:
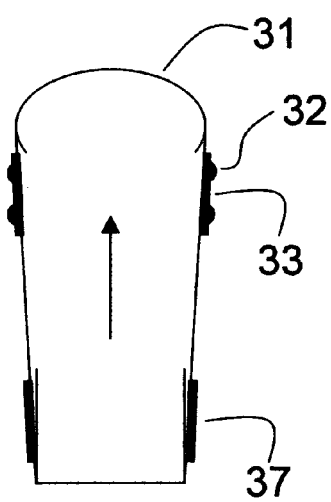
FIG. 1 is a view of a vehicle from above with front steering wheels positioned for straight driving and no flex fenders opened.

REFERENCE NUMERALS 31 front end of the vehicle
32 spring loaded flex fender securing rod on a fully closed flex fender
32A securing rod on fully opened flex fender with spring fully compressed
32B securing rod on closed side of flex fender with uncompressed spring
33 flex fender
34 wheel used for steering vehicle
35 ghost view from above of steering wheel turned to the right
36 ghost view from above of steering wheel turned to the left
37 fender cover for rear wheel that is not used as a steering wheel for the vehicle

DETAILED DESCRIPTION OF INVENTION

The present design is a vehicle body with all wheel openings covered to improve the aerodynamic shape. The mechanism used to open the steering wheel covers when necessary can be movement of the steering wheels. When the wheels are again turned straight the covers automatically close.

This design should not be limited by only showing two steering wheels with flex fenders and not more or less.
The advantages of the present Application are:
(a) an aerodynamically shaped vehicle reducing air turbulence and air resistance.
(b) an aerodynamically shaped vehicle having greater stability.
(c) an aerodynamically shaped vehicle body gently tapering from a wider front width to a narrower rear width.
(d) the wider front width portion of the body and fenders allows steering wheels to turn and perform most cornering within the body prior to opening the flex fenders and disturbing the aerodynamic shape.
(e) a system completely enclosing all wheels of the vehicle making it more aerodynamic.
(f) a design that does not require the body panels to open disturbing the aerodynamic shape except during small radius low speed turns.

FIGS. 1 through 6

Preferred Embodiment

Figure 2:
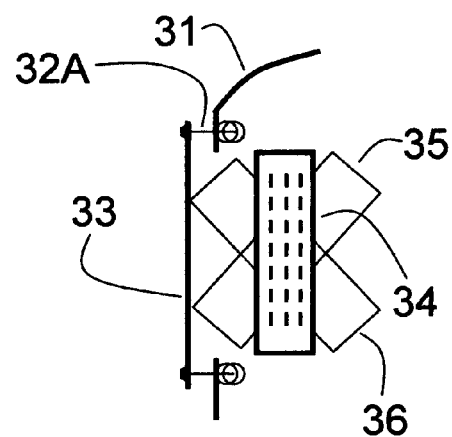
FIG. 2 is a ghost view from above of the left front fender of the vehicle showing a steering wheel positioned for straight driving within the fender; both maximum turning directions of the straight positioned wheel are also shown and the flex fender is shown in the fully opened position.

FIG. 1
This figure shows the vehicle from above positioned for straight driving. No flex fenders 33 are open.
FIG. 2
This figure shows only the left front fender of the vehicle from above. The flex fender 33 is shown fully opened on the vehicle and parallel to the body. This is to demonstrate how the fender can move away from the vehicle body. This position of the flex fender 33 would not occur during driving conditions. When making low speed small radius turn only one side of a flex fender 33 would open. The left front vehicle steering wheel 34 shown with tire treads is in the driving straight position. It is accompanied with views of this steering wheel 34 shown in the full right turn 35 and kill left turn 36 positions.

Figure 3:
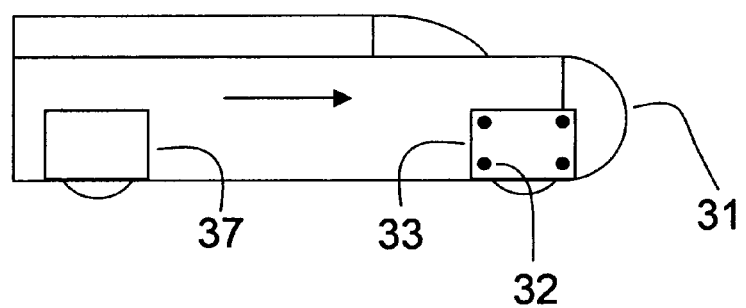
FIG. 3 is a side view of the vehicle showing all wheels covered.
Figure 4:
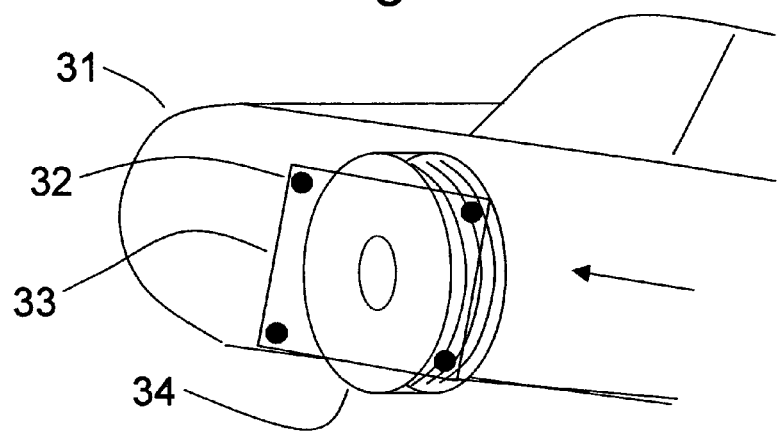
FIG. 4 is a ghost view of the steering wheel in a straight driving position behind the left front fender of the vehicle with the fender cover fully closed.
Figure 5:
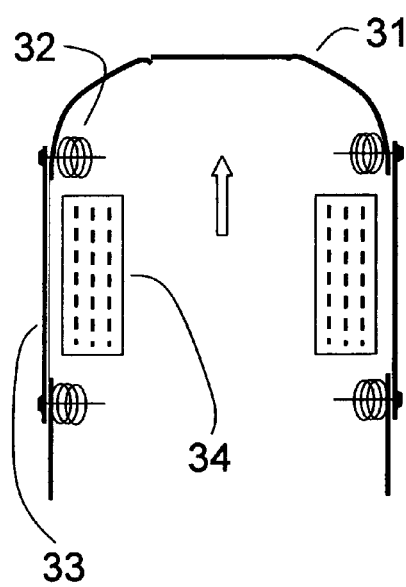
FIG. 5 is a ghost view from above of the vehicle with front steering wheels positioned for straight driving.
Figure 6:
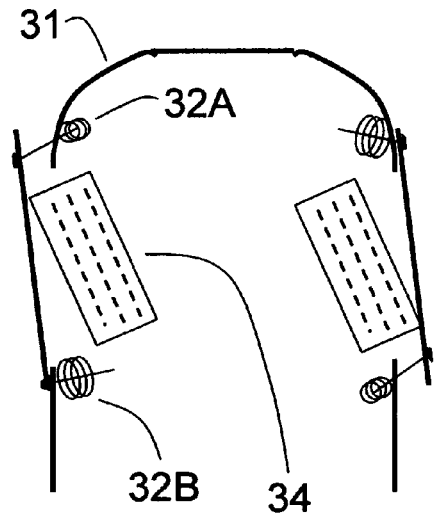
FIG. 6 is a ghost view from above of the vehicle with front steering wheels turned to make a left turn showing each flex fender opening.

FIG. 3
This figure is a side view of the vehicle.
FIG. 4
This figure is a left front view of the vehicle showing the position of the steering wheel 34 behind the flex fender 33.
FIG. 5
This figure is a ghost view of the front of the vehicle from above showing the steering wheels 34 in the straight drive position with both flex fender 33 fully closed.
FIG. 6
This figure is a ghost view of the front of the vehicle 31 from above showing both steering wheels 34 in the left turn position. The steering wheel 34 on the left side pushes out the front of the flex fender 33. The steering wheel 34 on the right side pushes out the rear of the flex fender 33.

These movements of the flex fenders 33 simulate actual driving conditions. The portions of the flex fender covers 33 making contact with the steering wheels 34 during turns may be of some low friction material. The portions of the flex fender 33 making contact with the steering wheels 34 during turns may be lubricated.

The invention claimed is:

1. A cover assembly for vehicle steering wheels that greatly reduces aerodynamic turbulence while the vehicle is in motion, comprising:
   a plurality of fender panels, each of which completely covers and overlaps the entire wheel opening of the wheels of the vehicle used for steering, each of said plurality of fender panels having corner regions; and
   a plurality of spring loaded securing rods that movably secure each of said plurality of fender panels to a vehicle body panel adjacent to each wheel opening, wherein each of said plurality of spring loaded securing rods is fixed at a first end to one of said corner regions and then extends inwardly therefrom through an aperture in the vehicle body panel with a spring being provided between an inner surface of the vehicle body panel and a second end of each spring loaded securing rod so as to bias each of said plurality of fender panels against a corresponding vehicle body panel,
   whereby each of said plurality of fender panels is in a closed position abutting the vehicle body panel during straight driving and relatively large radius turns and is displaced from the vehicle body panel by engagement of the wheels with an inside surface thereof during small radius, low speed turns, each of said plurality of fender panels returning to the closed position after completion of the small radius turn by action of the springs of the spring loaded securing rods.

2. The cover assembly of claim 1, wherein the vehicle body is wider at the front of the vehicle and tapers to be narrower toward the rear of the vehicle allowing front steering wheels to turn during most cornering without engaging the inside surface of the plurality of fender panels.

* * * * *